(12) United States Patent
Audren et al.

(10) Patent No.: US 6,204,590 B1
(45) Date of Patent: Mar. 20, 2001

(54) VIBRATION MOTORS

(75) Inventors: Jean-Thierry Audren, St Rémy les Chevreuse; Daniel Bezanere, Antony; François Munier, Montigny le Bretonneux, all of (FR)

(73) Assignee: SFIM Industries, Massy (FR)

( * ) Notice: Subject to any disclaimer, the term of this patent is extended or adjusted under 35 U.S.C. 154(b) by 0 days.

(21) Appl. No.: 09/373,003

(22) Filed: Aug. 12, 1999

(30) Foreign Application Priority Data

Aug. 13, 1998 (FR) .................................................. 98 10391

(51) Int. Cl.$^7$ ..................................................... H01L 41/04
(52) U.S. Cl. .............. 310/316.01; 310/317; 310/323.02; 310/328
(58) Field of Search ................. 310/81, 316.01, 310/316.02, 316.03, 317, 318, 320, 321, 323.02, 323.04, 323.06, 323.08, 323.09, 328, 331

(56) References Cited

U.S. PATENT DOCUMENTS

| 4,608,506 | * | 8/1986 | Tanuma | 310/315 |
| 4,980,599 | * | 12/1990 | Kuwabara et al. | 310/323 |
| 5,783,898 | * | 7/1998 | Wu | 310/316 |
| 6,060,816 | * | 5/2000 | Audren | 310/323.02 |

FOREIGN PATENT DOCUMENTS 0 907 213    4/1999   (EP) .

* cited by examiner

*Primary Examiner*—Nestor Ramirez
*Assistant Examiner*—Dang Dinh Le
(74) *Attorney, Agent, or Firm*—Jacobson, Price, Holman & Stern, PLLC

(57) ABSTRACT

A vibration motor includes a stator and a rotor and excitation arrangements for deforming the stator in vibratory modes combining tangential vibrations and normal vibrations intended to drive rotation of the rotor. The rotor and the excitation arrangements have dimensions such that the normal and tangential modes have similar resonant frequencies, or even the same resonant frequency, and correspond substantially to the excitation frequency.

15 Claims, 3 Drawing Sheets

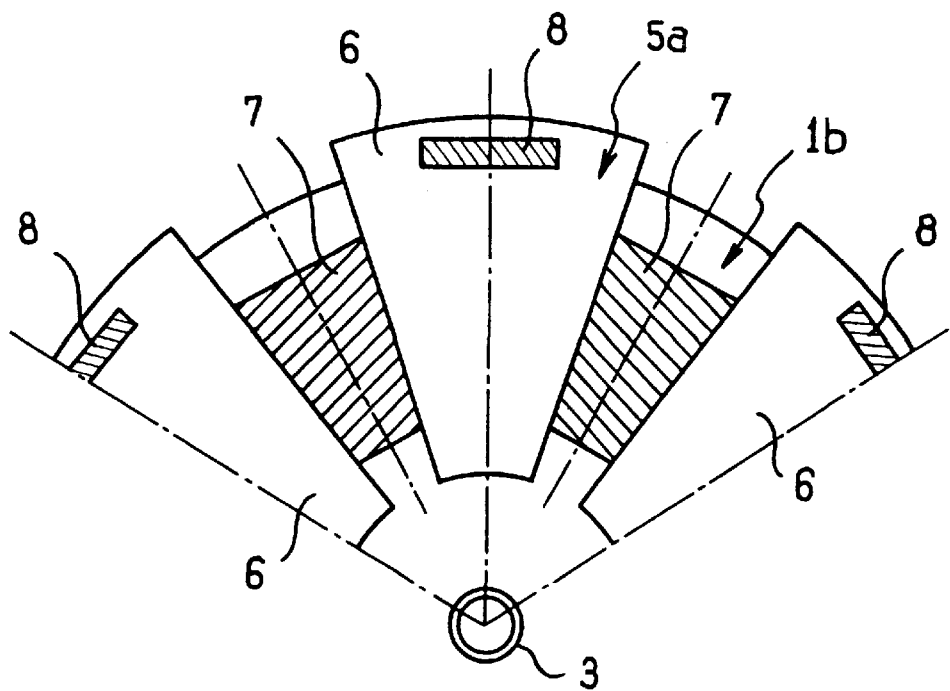
FIG_1
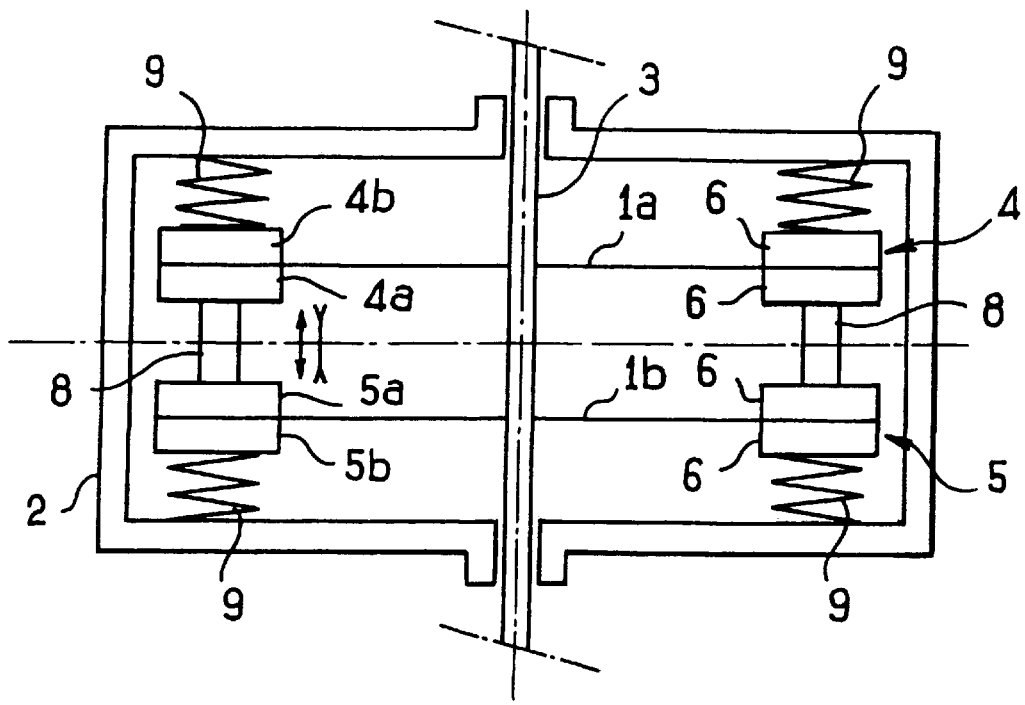
FIG_2

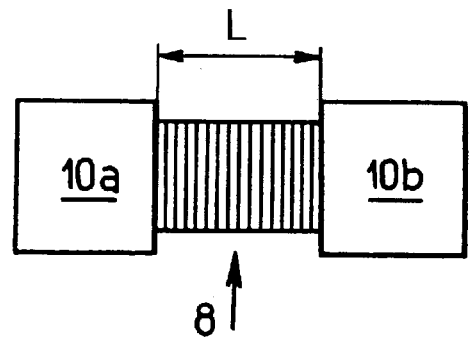
FIG_3
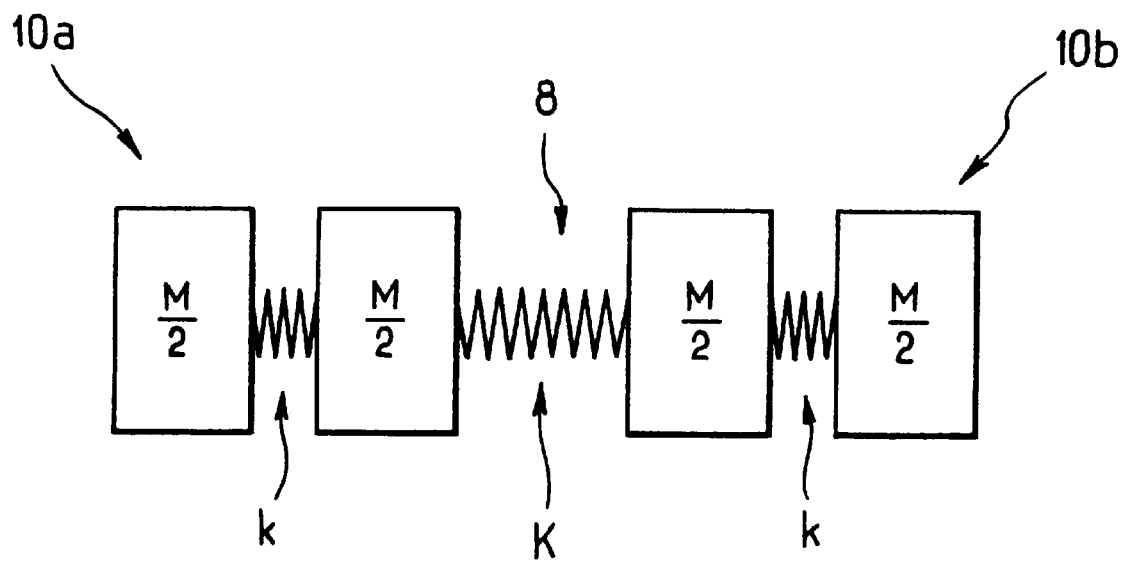
FIG_5

VIBRATION MOTORS

BACKGROUND OF THE INVENTION

1. Field of the Invention

The present invention concerns vibration motors.

2. Description of the Prior Art

Vibration motors are also known as ultrasound motors, referring to their preferred frequency, or piezo-active motors, referring to their preferred excitation material.

Several vibration motor structures having a high power to weight ratio combined with the ability to generate much higher mechanical powers than prior art vibration motors have already been proposed. See, for example, French patent applications 95-14.1169 and 97-10.948.

One particularly advantageous application of these motors concerns secondary flight controls in aircraft.

An aim of the invention is to propose improvements to vibration motors and in particular to optimize the efficiency of these motors.

Vibration motors conventionally combine tangential vibration modes, which correspond to deformations in directions parallel to the surface of contact between the rotor and the stator, and normal vibration modes, which correspond to deformations in directions normal to the surface of contact between the rotor and the stator.

Vibratory mechanical energy is taken from the tangential vibration modes to be converted into continuous movement (torque and angular speed) by the non-linear friction mechanism. These modes are therefore optimized primarily for efficient energy transfer.

In contrast, the normal vibration modes do not contribute to the final supply of energy. Their role is limited to supplying the oscillation of the rotor-stator contact bearing force needed to convert the tangential oscillatory movement of the stator into continuous tangential movement of the rotor. Consequently, the only loss of energy to which a normal oscillator is subjected is that due to its internal losses.

The tangential oscillators of the motor must be made to operate at their resonant frequency to optimize the main transfer of energy. This is known in itself.

The invention proposes to make the normal oscillators operate at their resonant frequency as well, i.e. to dimension the motor so that the normal and tangential modes have very similar resonant frequencies or even the same resonant frequency.

This minimizes dielectric losses in the active material and also minimizes losses in the electronic circuits feeding it.

SUMMARY OF THE INVENTION

For this reason, the invention proposes a vibration motor including a stator and a rotor and excitation means for deforming said stator in vibratory modes combining tangential vibrations and normal vibrations intended to drive rotation of the rotor, wherein the rotor and the excitation means have dimensions such that the normal and tangential modes have similar resonant frequencies, or even the same resonant frequency, and correspond substantially to the excitation frequency.

However, even with very close manufacturing tolerances, it is not possible to prevent fluctuation of various parameters (dimensions of parts, Young's modulus, density, etc) on which the resonant frequencies of the normal and tangential modes depend, for example because of temperature variations to which the motor may be subjected or because of ageing or wear of the various components of the motor.

For this reason, another aim of the invention is to propose a vibration motor structure that alleviates this drawback and automatically corrects any drift in the difference between the two frequencies, and possibly all or part of fixed differences.

To this end, the vibration motor structure proposed by the invention advantageously includes means for correcting the resonant frequency of the normal mode and/or the tangential mode in operation.

In particular, if the excitation means that generate the normal vibrations include piezo-electric active components, the electrical means driving the active components can be means for modifying the Young's modulus of said active components.

Advantageous examples of the embodiment of such means are described below.

Another object of the invention is to simplify the device for mechanically prestressing the piezo-electric material exciting the normal mode in the case of a motor including in a frame at least two pairs of stator plates which comprise tangential deformation active components, as well as two rotor disks which lie between the plates of both pairs, piezo-electric active members for generating a normal force which lie between the plates of both of the facing pairs, spring means being disposed between said pairs of plates and the frame.

In the solution proposed to this end, the active components for generating a normal force are excited so that the masses on opposite sides of the same rotor disk are in antiphase and the masses on opposite sides of the active component are also in antiphase.

The active components can be dimensioned in this case so as to satisfy the prestressing conditions.

Other features and advantages of the invention will emerge further from the following description. The description is purely illustrative and is not limiting on the invention. It must be read in conjunction with the accompanying drawings.

BRIEF DESCRIPTION OF THE DRAWINGS

FIG. 1 is a diagrammatic representation of one embodiment of a vibration motor in accordance with the invention seen in cross section.

FIG. 2 is a diagrammatic representation of the motor from FIG. 1 seen in axial section.

FIG. 3 is a diagrammatic representation of one normal oscillator of the structrure from FIG. 1.

FIG. 5 is another diagrammatic representation of one normal oscillator of the structure from FIG. 1.

DETAILED DESCRIPTION OF THE PREFERRED EMBODIMENT

Figure 4A:
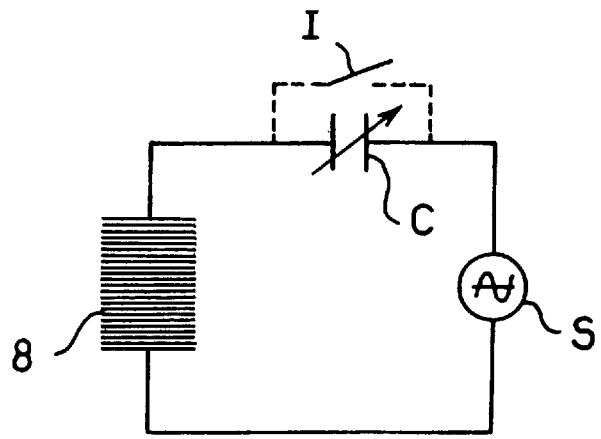
FIGS. 4a, 4b and 4c show ways of adjusting the normal resonant frequency of the motor from FIG. 1.

The vibration motor shown in FIGS. 1 and 2 includes two rotor disks 1a, 1b and two pairs 4, 5 of stator plates respectively cooperating with said disks 1a, 1b.

The two rotor disks 1a, 1b are flexible disks attached to a common shaft 3 by means of which they are mounted to rotate relative to a casing 2.

The disk 1a extends between the two stator plates 4a, 4b of the pair 4; the disk 1b extends between the two stator plates 5a, 5b of the pair 5.

The two plates 4a, 5a of the two pairs 4, 5 face each other and are referred to hereinafter as the inner plates, the two plates 4b, 5b being referred to as the outer plates.

Each stator plate 4a, 4b, 5a and 5b is made up of a plurality of contact sectors 6 (called stator petals) which are separated in pairs by tangential deformation active members 7.

These contact sectors 6 or petals are made of metal. They advantageously have at least one area made of a shape memory alloy near their contact surface (as described in our French patent application No. 95/14169).

The contact sectors 6 of the two inner plates 4a, 5a are aligned with each other. Active members 8 for generating a normal force are disposed between the sectors 6 of the two inner plates 4a, 5a.

Spring means 9 are disposed between the casing 2 and the contact sectors 6 of the outer plates 4b, 5b.

When an active member 8 increases in length the contact sectors 6 with which it is aligned grip the rotor disks 1. When it decreases in length the corresponding contact sectors 6 release the disks 1.

The spring means 9 are of low stiffness but have sufficient elongation to hold the contact sectors 6 pressed against the rotor disks when they are compressed by the increase in the length of the active members 7 and 8.

The active members 7 and/or 8 advantageously have multilayer structures integrating in parallel or in series piezo-electric ceramic layers and metallic layers and also integrating command electrodes. A multilayer structure of the above kind has the advantage of enabling the use of low voltages.

Two active members 7 on respective opposite sides of the same sector 6 are excited in antiphase. Similarly, two adjoining active members 8 are also excited in antiphase.

The active members 8 for generating a normal force are commanded with the same excitation frequency as the tangential deformation active members 7.

The vibration motor in accordance with the invention that has just been described has dimensions such that the normal resonant frequency and the tangential resonant frequency are both substantially equal to this excitation frequency.

The remainder of the text concerns one normal oscillator of the structure, i.e. an oscillator including (see FIG. 3):

a piezo-electric component 8, two modules 10a, 10b of the same mass M on either side thereof and each including the metal petals 6 and the portions of the disks 1a, 1b which are in line with the piezo-electric component.

The natural frequency F of the normal oscillator is:

$$F = \frac{1}{2\pi}\sqrt{\frac{2K}{M}}$$

where K is the stiffness of the active component 8 in the direction of the normal vibrations and has the value $$K = E\frac{S}{l}$$

where E is the Young's modulus of said component 8, S its cross section and l its length.

Piezo-electric materials have two Young's moduli: one when the electrodes are open circuit and the other when the electrodes are short circuited, the Young's modulus with the electrodes open circuit being the higher of the two. The values of the two moduli are respectively $$\frac{1}{S^D} \text{ and } \frac{1}{S^E}$$

where
$S^D$=open circuit flexibility
$S^E$=closed circuit flexibility and
$S^E-S^D=d^2\epsilon$
d=piezo-electric coefficient
$\epsilon$=dielectric permittivity.

The existence of the two Young's moduli can be explained as follows: when open circuit, application of an external force creates not only deformation but also charges which remain on the electrodes to generate an electric field whose effect via the piezo-electric coefficient is to oppose the external force. If the electrodes are short circuited, the charges are removed and there is no electric field.

The piezo-electric material of an active component 8 "sees" between its electrodes the impedance of the electrical generator that excites it, i.e. a zero impedance (short circuit) if the generator is a voltage generator and an infinite impedance (open circuit) if the generator is a current generator.

In a first variant of the invention, the means for adjusting the natural frequency of the oscillator can include an electrical circuit including a selectively operated switch so that the active component 8 is alternatively connected to a voltage generator and to a current generator, the drive signal being a pulse width modulated signal whose frequency and duty cycle are varied in accordance with the required resonant frequency.

FIG. 4a shows another solution in accordance with the invention. In this solution, the circuit driving the active component 8 is a voltage supply S in series with a variable impedance C, or an equivalent circuit. The variable impedance C is preferably a capacitive impedance to avoid introducing energy losses that would constitute additional damping in the oscillator.

A piezo-electric material active component 8 is electrically equivalent to a capacitor. A variable capacitor is preferably chosen for the drive circuit which can be varied between a very high value relative to the capacitance of the piezo-electric material (by a ratio of 10:1, for example) and a small value relative to that capacitance (by a ratio of 1:10, for example), to obtain the maximum excursion of stiffness and therefore of frequency.

Switching means I are advantageously also provided for short circuiting the variable impedance to obtain the lowest stiffness.

Figure 4B:
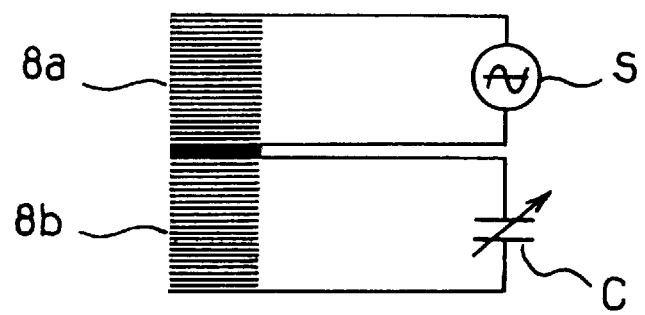
Figure 4C:
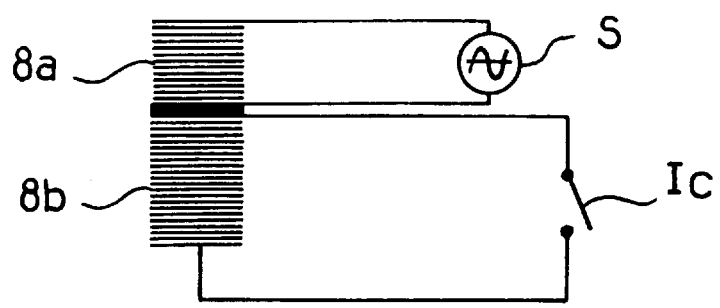

FIGS. 4b and 4c show further variants of the invention. These variants are preferred over that shown in FIG. 4a, which has the following drawbacks in particular:
varying the capacitance varies the drive voltage of the active component 8;
it is additionally necessary to provide inductive tuning means to reduce the supply voltage and losses, and the inductance of such inductive means must vary at the same time as the capacitance.

In the FIG. 4b circuit, the piezo-electric material of an active component 8 is separated into two parts 8a and 8b driven separately.

One of these parts (part 8a in FIG. 4b) is driven exclusively by a fixed impedance generator S, for example a voltage generator.

The other part (part 8b in FIG. 4b) is mounted between the two ends of a variable impedance (capacitor C).

Modifying the stiffness of the part 8b by modifying the value of the variable impedance modifies the stiffness of the whole of the component 8.

In the variant shown in FIG. 4c, the part 8b shunts a selectively operable switch Ic instead of a variable capacitor.

According to whether the switch Ic is open or closed, the stiffness of the component 8b is minimum value or maximum.

Two types of drive are feasible:

One at a frequency higher than the excitation frequency, so that the average stiffness over a period confers the required resonance period on the resonator. Note that the relationship is not a simple average, but depends on the times at which switching occurs within the period.

The other at a frequency lower than the excitation frequency, to obtain groups of short periods and groups of long periods whose combination is the equivalent of the required average period.

Note that when the circuit is open the part 8b can be used as a sensor of the deformation of the piezo-electric material.

The part 8b can equally serve as a deformation sensor when it is connected to a variable capacitor. Obviously in this case the electrical gradient of the measurement is a function of the capacitance.

The following description is concerned with the prestressing of the piezo-electric material.

The minimal value of the prestress up of the piezo-electric material for there to be no tensile stress is:

$$E\frac{2x_n}{1}$$

l=length of material
E=Young's modulus
$x_n$=amplitude of normal oscillation of each of the metal petals 6.

The following must also apply:

$$\sigma p + E\frac{2x_n}{1} \leq \sigma_{max}$$

$\sigma_{max}$=maximal compression stress.

On the other hand, the resonant frequency defines K such that:

$$K = (2\pi F)^2 \frac{M}{2}$$

Moreover, the maximal value $\Delta U$ of the oscillating part of the rotor/stator bearing force is:

$$\Delta U = \frac{M}{2}(2\pi F)^2 x_n$$

For the rotor and the stator to remain in mutual bearing engagement at all times, the prestressing springs must produce a static force $U_O$ greater than or equal to $\Delta U$. It is not beneficial for this force to be much greater than $\Delta U$ because it would then reduce the efficiency of the motor. It is therefore desirable for $U_O$ to be practically equal to $\Delta U$.

For the force $U_O$ also to prestress the ceramic, in order to simplify the mechanical construction, the following condition must apply:

$$\frac{U_o}{S} = \sigma p$$

which finally yields:

$$\sigma p = E\frac{x_n}{1}$$

Thus it is not possible to satisfy the first condition:

$$\sigma p \geq E\frac{2x_n}{1}$$

A first solution to the above problem would be to make the member of stiffness K from two materials in parallel, one piezo-electric and the other metallic. Because of its tensile strength, the metal can assure the missing prestressing. Although this solution is feasible, it is subject to manufacturing disadvantages, for two main reasons:

to assure the prestressing the metal must be solidly anchored in the masses or form a small box encapsulating the piezo-electric material; this small box must be closed for prestressing and severely limits wiring access to the piezo-electric material;

it is not easy to maintain the prestressing constant as a function of temperature without designing the metallic part to be much more flexible than the piezo-electric part by surrounding it or imparting a-corrugated shape to it.

The solution proposed by the invention exploits, as illustrated in FIG. 5, the flexibility of the rotor-stator interface.

Patent application 95 14169 explains the benefit of this flexibility for improving the efficiency of conversion of vibration into continuous movement using fields of metallic pins. There is some latitude as to the choice of the normal stiffness k of this interface structure.

In accordance with one aspect of the present invention it is proposed that this interface stiffness should be chosen to solve the problem of prestressing the piezo-electric material.

Note firstly that the mechanical oscillator described with reference to FIG. 1 can be actuated in two different normal vibration modes.

In the first mode the metallic petals 6 on respective opposite sides of the disk 1a (respectively 1b) are excited in phase with each other and in antiphase with the petals on respective opposite sides of the other disk of the rotor, i.e. the disk 1b (respectively 1a).

This mode of excitation corresponds to that described in application FR 97 10948 and to a resonant frequency of:

$$F_1 = \frac{1}{2\pi}\sqrt{\frac{2K}{M} + \frac{2k}{M}\sqrt{\frac{4K^2}{M^2} + \frac{4k^2}{M^2}}}$$

However, a second mode of excitation is feasible in which the masses of respective opposite sides of the same disk 1a, 1b of the rotor are excited in antiphase and the masses on respective opposite sides of an active member are also in antiphase.

The frequency of this second mode is:

$$F_2 = \frac{1}{2\pi}\sqrt{\frac{2K}{M} + \frac{2k}{M}\sqrt{\frac{4K^2}{M^2} + \frac{4k^2}{M^2}}}$$

The above two frequencies lie one on each side of the previously defined frequency $$F = \frac{1}{2\pi}\sqrt{\frac{2K}{M}} = F$$

which can be obtained from the formula for F1 by making k tend to infinity.

For a given resonant frequency $F_0$ the complementary terms under the square root sign mean that, using the second inherent mode of vibration, a value of K can be chosen that is smaller for the same value of $F_O$. It is then possible to choose a smaller S or a larger l in the expression $$K = \frac{ES}{l},$$

and to satisfy the requirement of prestressing the piezo-electric material.

There is claimed:

1. A vibration motor including a stator and a rotor and excitation means for deforming said stator in vibratory modes combining tangential vibrations and normal vibrations intended to drive rotation of said rotor, said normal vibrations and said tangential vibrations having at least similar resonant frequencies and even a same resonant frequency, and corresponding substantially to an excitation frequency.

2. The motor claimed in claim 1 further including means for correcting the resonant frequency of said normal vibrations and/or said tangential vibrations in operation.

3. The motor claimed in claim 2 wherein said excitation means which generate said normal vibrations include piezo-electric active components and electrical means that drive said piezo-electric active components include means for modifying the Young's modulus of said piezo-electric active components.

4. The motor claimed in claim 3 wherein said electrical means which drive an active component of said piezo-electric active components include a switch circuit controlled so that said active component of said piezo-electric active components is alternatively connected to a voltage generator and to a current generator, a driving frequency and duty cycle depending on a required resonant frequency for said normal vibrations.

5. The motor claimed in claim 3 wherein said electrical means which drive an active component of said piezo-electric active components comprise a voltage supply in series with a variable impedance.

6. The motor claimed in claim 5 further including means for short circuiting the variable impedance.

7. The motor claimed in claim 3 wherein an active component of said piezo-electric active components is in two parts, one which is driven by a fixed impedance generator and the other which shunts the variable impendence or a selectively operable switch.

8. A vibration motor including a stator and a rotor and excitation means for deforming said stator in vibratory modes combining tangential vibrations and normal vibrations intended to drive rotation of said rotor, said normal vibrations and said tangential vibrations having at least similar resonant frequencies and even a same resonant frequency, and corresponding substantially to an excitation frequency, a frame having at least two pairs of stator plates including tangential deformation active components, as well as two rotor disks which lie between said stator plates of both pairs, piezo-electric active components for generating a normal force which lie between said stator plates of both of the pairs, spring means being disposed between said pairs of plates and said frame, said piezo-electric active components for generating a normal force are excited so that masses on respective opposite sides of a same rotor disk are in antiphase and the masses on respective opposite sides of said active piezo-electric components are also in antiphase, said piezo-electric active components complying with pre-stressing conditions.

9. The motor claimed in claim 8 further including means for correcting the resonant frequency of said normal vibrations and/or said tangential vibrations in operation.

10. The motor claimed in claim 9 wherein said excitation means which generate said normal vibrations include piezo-electric active components of said piezo-electric active components and electrical means that drive said piezo-electric active components include means for modifying the Young's modulus of said piezo-electric active components.

11. The motor claimed in claim 10 wherein said electrical means which drive an active component of said piezo-electric active components include a switch circuit controlled so that said active component of said piezo-electric active components is alternatively connected to a voltage generator and to a current generator, a driving frequency and duty cycle depending on a required resonant frequency for said normal vibrations.

12. The motor claimed in claim 10 wherein said electrical means which drive an active component of said piezo-electric active components comprise a voltage supply in series with a variable impedance.

13. The motor claimed in claim 12 further including means for short circuiting the variable impedance.

14. The motor claimed in claim 10 wherein an active component of said piezo-electric active components is in two parts, one which is driven by a fixed impedance generator and the other which shunts the variable impendence or a selectively operable switch.

15. A vibration motor for moving an aerodynamic control surface of an aircraft, said vibration motor comprising: a stator and a rotor and excitation means for deforming said stator in vibratory modes combining tangential vibrations and normal vibrations intended to drive rotation of said rotor, said normal vibrations and said tangential vibrations having at least similar resonant frequencies and even a same resonant frequency, and corresponding substantially to an excitation frequency.

* * * * *